United States Patent
Wettan

(10) Patent No.: US 11,049,105 B2
(45) Date of Patent: Jun. 29, 2021

(54) NETWORK APPLIANCE WITH SECURE ELEMENT

(71) Applicant: Visa International Service Association, San Francisco, CA (US)

(72) Inventor: Howard Marc Wettan, Burlingame, CA (US)

(73) Assignee: Visa International Service Association, San Francisco, CA (US)

(*) Notice: Subject to any disclaimer, the term of this patent is extended or adjusted under 35 U.S.C. 154(b) by 104 days.

(21) Appl. No.: 15/980,941

(22) Filed: May 16, 2018

(65) Prior Publication Data

US 2019/0354975 A1    Nov. 21, 2019

(51) Int. Cl.
*G06Q 20/40* (2012.01)
*H04L 29/06* (2006.01)

(52) U.S. Cl.
CPC ......... *G06Q 20/401* (2013.01); *H04L 63/101* (2013.01)

(58) Field of Classification Search
CPC ............................ G06Q 20/401; H04L 63/101
See application file for complete search history.

(56) References Cited

U.S. PATENT DOCUMENTS

| | | | |
|---|---|---|---|
| 8,346,672 B1 * | 1/2013 | Weiner | H04W 12/06 705/75 |
| 9,294,476 B1 | 3/2016 | Lurey et al. | |
| 9,396,466 B2 | 7/2016 | Monjas Llorente et al. | |
| 10,134,202 B2 * | 11/2018 | Schleicher | G07B 17/00435 |
| 2013/0282523 A1 * | 10/2013 | Pfeffer | G06Q 30/06 705/26.35 |
| 2014/0108263 A1 * | 4/2014 | Ortiz | G06Q 20/3278 705/71 |
| 2016/0012433 A1 | 1/2016 | Marenick | |
| 2016/0098693 A1 | 4/2016 | Shauh et al. | |
| 2016/0247138 A1 | 8/2016 | Wallner | |
| 2016/0300237 A1 | 10/2016 | Khan et al. | |
| 2017/0063798 A1 * | 3/2017 | Lapidous | H04L 63/0281 |
| 2017/0339151 A1 * | 11/2017 | Van Os | H04W 12/06 |
| 2018/0205718 A1 * | 7/2018 | Moran | H04L 63/083 |

OTHER PUBLICATIONS

Chen, PCT/US2017/065498, entitled "System, Method, and Apparatus for User-Less Payment on Delivery", filed Dec. 11, 2017, 33 pages.

* cited by examiner

*Primary Examiner* — Scott C Anderson
(74) *Attorney, Agent, or Firm* — The Webb Law Firm

(57) ABSTRACT

Described herein is a network apparatus with secure element and related systems, methods, and apparatuses. A described method includes receiving a request to perform a transaction. The method also includes obtaining confirmation that a network address associated with the request corresponds to a registered physical address. The method further includes obtaining account data and conducting a transaction using the account data.

5 Claims, 7 Drawing Sheets

NETWORK APPLIANCE WITH SECURE ELEMENT

BACKGROUND

1. Field of the Invention

This invention relates generally to network appliances and, in one particular embodiment, to a network appliance with a secure element.

2. Description of Related Art

Electronic commerce has evolved such that numerous electronic devices may reside within a particular physical location, such as a home or office. Each of these devices may be capable of individually purchasing goods or services, or otherwise conducting commerce. The rise of this "Internet of Things" (or "IOT") has further increased the proliferation of small and/or inexpensive electronic devices, but many such devices lack typical forms of user input, such as display screens, keyboards, etc. The ubiquity of these devices also creates a problem for electronic commerce, as it is impractical, unwieldy, and insecure to allow each device to store account data, and to update account data when it changes. What is needed is a way for such devices to securely conduct commerce using proximately stored account data which can be provided to merchants with minimal to zero user intervention, and can be easily updated as necessary.

SUMMARY OF THE INVENTION

Embodiments of the invention are directed to systems, methods, and apparatuses for the provisioning and use of account data by a network appliance to complete transactions initiated by electronic devices residing on the same network with or proximate to the network appliance without the involvement or presence of, or intervention by, human actors. In some embodiments, a consumer may maintain a network appliance within their home or place of business capable of storing and transmitting account data for performing e-commerce transactions. Benefits of the embodiments disclosed herein include allowing a consumer to conduct electronic transactions on numerous disparate devices without requiring the consumer to individually provision account data onto each particular device. Additional benefits include enabling a merchant to assess the risk of individual e-commerce transactions by determining whether a network address corresponds to a registered physical address from which a transaction is being conducted, and then determining that these addresses further correspond to account data (including an account billing address), thus providing a merchant assurance that the device and consumer conducting a transaction are authorized to do so and that the transaction is not otherwise fraudulent. Added assurance may be provided when the registered physical address is also used for product shipping. Additional benefits of these embodiments include the ease of performing e-commerce transactions without the need to manually provide account data to a merchant.

According to a non-limiting embodiment or aspect, provided is a method of provisioning account data to a network appliance comprising: obtaining, by a resource provider, a network address associated with the network appliance; obtaining, by the resource provider, a registered physical address associated with an account; associating, by the resource provider, the physical address with the network address; adding, by the resource provider, the network address to a list of authorized network addresses; and provisioning, by the resource provider, account data to the network appliance, wherein said provisioning comprises sending the account data to the network appliance for storage in a secure element.

In some non-limiting embodiments or aspects, the method further comprises receiving, by the resource provider, a request to confirm that a network address is on the list of authorized network addresses.

In some non-limiting embodiments or aspects, the method further comprises sending, by the resource provider, a confirmation that the network address is on the list of authorized network addresses.

In some non-limiting embodiments or aspects, the step of obtaining a registered physical address further comprises sending, by the resource provider, a request to an ISP account server, wherein the request contains the network address.

In some non-limiting embodiments or aspects, the method further comprises obtaining, by the resource provider, the account data from a payment network, a token vault, an issuing financial institution, or any combination thereof, prior to provisioning the account data.

According to a non-limiting embodiment or aspect, provided is a method of performing a transaction comprising: receiving, by a transaction server, a request to perform a transaction, wherein the request is sent from a computing device; obtaining, by the transaction server, confirmation that a network address associated with the request corresponds to a registered physical address; obtaining, by the transaction server, account data; and conducting, by the transaction server, a transaction using at least a part of the account data, wherein the account data includes the registered physical address.

In some non-limiting embodiments or aspects, the step of obtaining confirmation that the network address corresponds to the registered physical address comprises sending, by the transaction server, the network address to at least one of a resource provider, an ISP account server, a payment network, a token vault, or any combination thereof.

In some non-limiting embodiments or aspects, the account data is obtained from a network appliance.

In some non-limiting embodiments or aspects, the account data is obtained from a resource provider after obtaining the confirmation that the network address corresponds to the registered physical address.

In some non-limiting embodiments or aspects, the method further comprises obtaining, by the transaction server, the registered physical address; and prepopulating, by the transaction server, a shipping address data field using the registered physical address.

According to a non-limiting embodiment or aspect, provided is a network appliance transaction method, comprising: receiving, by a network appliance, a data packet containing a request to perform a transaction; inspecting, by the network appliance, the data packet to confirm that it originated from a computing device authorized to conduct transactions; retrieving, by the network appliance, account data from a secure element; modifying, by the network appliance, the data packet to include the account data, resulting in a modified data packet; and sending, by the network appliance, the modified data packet to a transaction server.

In some non-limiting embodiments or aspects, the network appliance decrypts the data packet prior to modifying the data packet.

In some non-limiting embodiments or aspects, the network appliance encrypts the modified data packet prior to sending the modified data packet to the transaction server.

According to a non-limiting embodiment or aspect, provided is a network appliance comprising: a processor; a power supply; a network interface; a secure element; and a memory including instructions that, when executed by the processor, cause the network appliance to: receive a request to perform a transaction; retrieve account data from the secure element; and send the account data to a transaction server.

In some non-limiting embodiments or aspects, the request to perform the transaction is received from a computing device, wherein the memory further includes instructions that, when executed, cause the network appliance to confirm that the computing device is authorized to conduct transactions.

In some non-limiting embodiments or aspects, the memory further includes instructions that, when executed, cause the computing device to require user authentication to authorize the device to conduct transactions.

In some non-limiting embodiments or aspects, the memory further includes instructions that, when executed, cause the network appliance to insert the account data into the received request to perform the transaction.

In some non-limiting embodiments or aspects, the step of sending the account data to the transaction server comprises sending the request to perform the transaction to the transaction server.

In some non-limiting embodiments or aspects, the memory further includes instructions that, when executed, cause the network appliance to receive a request for account data from the transaction server.

In some non-limiting embodiments or aspects, the account data includes a registered physical address.

In some non-limiting embodiments or aspects, the memory further includes instructions that, when executed, cause the network appliance to confirm that the computing device is connected to the same local network as the network appliance.

Further embodiments or aspects are set forth in the following numbered clauses:

Clause 1. A method of provisioning account data to a network appliance comprising: obtaining, by a resource provider, a network address associated with the network appliance; obtaining, by the resource provider, a registered physical address associated with account; associating, by the resource provider, the physical address with the network address; adding, by the resource provider, the network address to a list of authorized network addresses; and provisioning, by the resource provider, account data to the network appliance, wherein said provisioning comprises sending the account data to the network appliance for storage in a secure element.

Clause 2. The method of clause 1, further comprising receiving, by the resource provider, a request to confirm that a network address is on the list of authorized network addresses.

Clause 3. The method of any of clauses 1 and 2, further comprising sending, by the resource provider, a confirmation that the network address is on the list of authorized network addresses.

Clause 4. The method of any of clauses 1-3, wherein the step of obtaining a registered physical address further comprises sending, by the resource provider, a request to an ISP account server, wherein the request contains the network address.

Clause 5. The method of any of clauses 1-4, further comprising obtaining, by the resource provider, the account data from a payment network, a token vault, an issuing financial institution or any combination thereof, prior to provisioning the account data.

Clause 6. A method of performing a transaction comprising: receiving, by a transaction server, a request to perform a transaction, wherein the request is sent from a computing device; obtaining, by the transaction server, confirmation that a network address associated with the request corresponds to a registered physical address; obtaining, by the transaction server, account data; and conducting, by the transaction server, a transaction using at least a part of the account data, wherein the account data includes the registered physical address.

Clause 7. The method of clause 6, wherein the step of obtaining confirmation that the network address corresponds to the registered physical address comprises sending, by the transaction server, the network address to at least one of a resource provider, an ISP account server, a payment network, a token vault, or any combination thereof.

Clause 8. The method of any of clauses 6 and 7, wherein the account data is obtained from a network appliance.

Clause 9. The method of any of clauses 6-8, wherein the account data is obtained from a resource provider after obtaining the confirmation that the network address corresponds to the registered physical address.

Clause 10. The method of any of clauses 6-9, further comprising: obtaining, by the transaction server, the registered physical address; and prepopulating, by the transaction server, a shipping address data field using the registered physical address.

Clause 11. A network appliance transaction method comprising: receiving, by a network appliance, a data packet containing a request to perform a transaction; inspecting, by the network appliance, the data packet to confirm that it originated from a computing device authorized to conduct transactions; retrieving, by the network appliance, account data from a secure element; modifying, by the network appliance, the data packet to include the account data; and sending, by the network appliance, a modified data packet to a transaction server.

Clause 12. The method of clause 11, wherein the network appliance decrypts the data packet prior to modifying the data packet.

Clause 13. The method of any of clauses 11 and 12, wherein the network appliance encrypts the modified data packet prior to sending the modified data packet to the transaction server.

Clause 14. A network appliance comprising: a processor; a power supply; a network interface; a secure element; and a memory including instructions that, when executed by the processor, cause the network appliance to: receive a request to perform a transaction; retrieve account data from the secure element; and send the account data to a transaction server.

Clause 15. The network appliance of clause 14, wherein the request to perform the transaction is received from a computing device, and wherein the memory further includes instructions that, when executed, cause the network appliance to confirm that the computing device is authorized to conduct transactions.

Clause 16. The network appliance of any of clauses 14 and 15, wherein the memory further includes instructions that, when executed, cause the computing device to require user authentication to authorize the device to conduct transactions.

Clause 17. The network appliance of any of clauses 14-16, wherein the memory further includes instructions that, when executed, cause the network appliance to insert the account data into the received request to perform the transaction.

Clause 18. The network appliance of any of clauses 14-17, wherein the step of sending the account data to the transaction server comprises sending the request to perform the transaction to the transaction server.

Clause 19. The network appliance of any of clauses 14-18, wherein the memory further includes instructions that, when executed, cause the network appliance to receive a request for account data from the transaction server.

Clause 20. The network appliance of any of clauses 14-19, wherein the account data includes a registered physical address.

Clause 21. The network appliance of any of clauses 14-20, wherein the memory further includes instructions that, when executed, cause the network appliance to confirm that the computing device is connected to the same local network as the network appliance.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Figure 1:
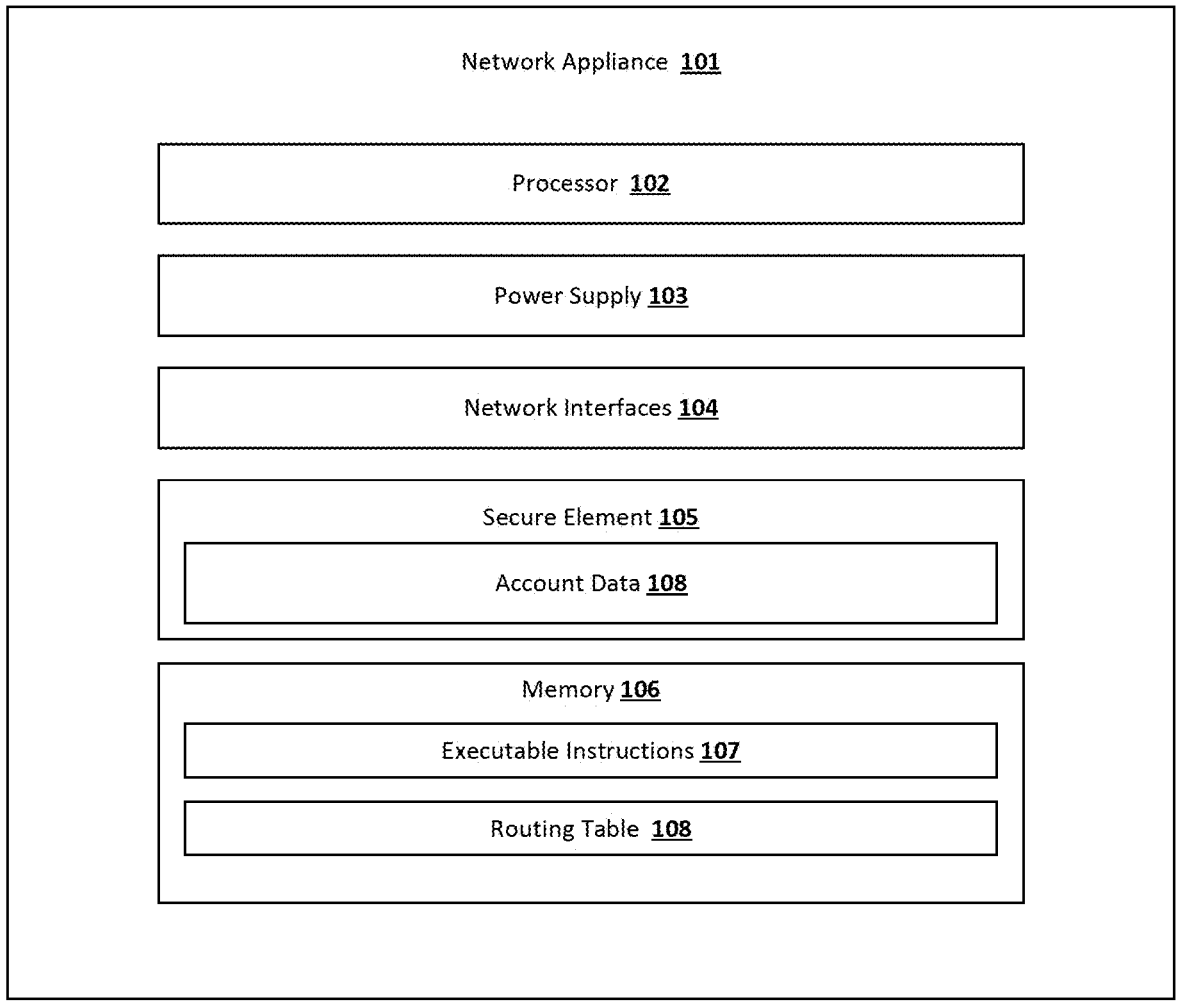
FIG. 1 depicts aspects of elements that may be present in a network appliance configured to implement a method and/or process in accordance with some embodiments of the present invention.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. Prior to discussing embodiments of the invention, description of some terms may be helpful in understanding these embodiments.

"Account data" may include payment account information or digital representations of value that can be used in a payment transaction. Non-limiting examples of account data may include a PAN (primary account number or "account number"), a bank account number, a credit card or debit card number, health insurance information, gift card account data, loyalty account information, secret keys, and any additional information required to supplement such data, including an expiration date, a CVV2 value, name, and billing address. Account data may also include any data representative of the aforementioned payment account information, such as a payment token, or any other account alias. Account data may also include data associated with cryptocurrencies.

"Authorization request message" may include a message sent to request an authorization. An authorization request message may comply with ISO 8583, which is a standard for the exchange of messages in a financial transaction system. An authorization request message according to other embodiments may comply with other suitable standards. Typically, an authorization request message is generated by a server and sent to an issuing financial institution.

"Communication" and "communicate" refer to the receipt or transfer of one or more signals, messages, calls, commands, or other type of data. For one unit (e.g., any device, system, or component thereof) to be in communication with another unit means that the one unit is able to receive data from and/or transmit data to the other unit. A communication may use a direct or indirect connection and may be wired and/or wireless in nature. Additionally, two units may be in communication with each other even though the data transmitted may be modified, processed, routed, etc., between the first and second unit. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

A "communication channel" may refer to any suitable path for communication between two or more entities. Any suitable communications protocols may be used for generating a communications channel. A communication channel may in some instances comprise a "secure communication channel" or a "tunnel," either of which may be established in any known manner, including the use of mutual authentication and a session key and establishment of a secure communications session. However, any method of creating a secure communication channel may be used, and communication channels may be wired or wireless, as well as long-range, short-range, or medium-range.

A "data packet" or a "network packet" may be any formatted unit of electronic data transported across a communications network, and structured according to a commonly agreed format. Data packets may contain header and payload sections, and may contain additional information including a source address, a destination address, and other information relevant to the packet's transport. Non-limiting examples of data packets may include Internet Protocol packets, and may, but need not, be specifically related to specific layers of the Open Systems Interconnection ("OSI")

Model, and as used herein, may also comprise frames, segments, datagrams, or other units of data.

A "network appliance" may be a fixed or portable device capable of storing and communicating, among other things, payment information and other data over at least one communication channel. In some non-limiting embodiments, a network appliance may have a connection to the Internet, and may also be capable of communicating with devices in proximity over a variety of wired or wireless communication channels. A network appliance may include or function as a modem, router, network switch, repeater, home automation hub, or smart appliance, as examples. In some non-limiting embodiments, a network appliance may include a smartphone, tablet computer, or other type of computing, networking, or telecommunications equipment.

A "payment processing system," "payment processing network," or "payment network" may include data processing server computers, subsystems, networks, and operations used to support and deliver authorization services, exception file services, and clearing and settlement services. An exemplary payment processing system or network may include VisaNet. Payment processing systems and networks are able to process credit card transactions, debit card transactions, and other types of commercial transactions. Payment processing systems and networks may also have systems which perform clearing and settlement services. The payment processing system or network may use any suitable wired or wireless network, including but not limited to the Internet, to permit communication and data transfer between components or elements.

A "payment token" or "token" may include an identifier for a payment account that is a substitute for an account identifier, such as a PAN. For example, a payment token may include a series of numeric and/or alphanumeric characters that may be used as a substitute for an original account identifier. For example, a payment token "4900 0000 0000 0001" may be used in place of a PAN "4147 0900 0000 1234." In some embodiments, a payment token may be "format preserving" and may have a numeric format that conforms to the account identifiers used in existing payment processing networks (e.g., ISO 8583 financial transaction message format). In some embodiments, a payment token may be used in place of a PAN to initiate, authorize, settle, or resolve a payment transaction or represent the original credential in other systems where the original credential would typically be provided. In some embodiments, a token value may be generated such that the recovery of the original PAN or other account identifier from the token value may not be computationally derived (e.g., with a one-way hash or other cryptographic function). Further, in some embodiments, the token format may be configured to allow the entity receiving the payment token to identify it as a payment token and recognize the entity that issued the token.

A "physical address" may include an identifier indicative of a physical location. Non-limiting examples include a street address, postal/mailing address, and/or geographical coordinates.

"Provisioning" may include a process of enabling a device to use a resource or service. In some embodiments, provisioning may involve enabling a device to perform transactions using an account. Provisioning can include adding provisioning data associated with account data (e.g., a payment token representing an account number) to a device.

A "resource provider" may be an entity that can provide goods, services, information, and/or access. Examples of a resource provider include merchants, access devices, secure data access points, token service providers, token requestors, or other servers.

A "server" may include one or more computing devices, which can be individual, stand-alone machines located at the same or different locations, may be owned or operated by the same or different entities, and may further be one or more clusters of distributed computers or "virtual" machines housed within a datacenter. It should be understood and appreciated by a person of skill in the art that functions performed by one "server" can be spread across multiple disparate computing devices for various reasons. As used herein, a "server" is intended to refer to all such scenarios and should not be construed or limited to one specific configuration. Further, a server as described herein may, but need not, reside at (or be operated by) a merchant, a shipping company, an acquiring bank, a payment network, a financial institution, a cryptocurrency transaction network (such as a public or private blockchain), or agents of any of the aforementioned entities.

A "secure element" may include a secure computer memory in an electronic device capable of storing sensitive data or applications. A secure element may, but need not be, physically isolated from other memory in an electronic device. A secure element may comprise, or may be contained within, a hardware security module, a software security module, or other mechanism providing for secure and controlled access to the data stored within it. A secure element may further comprise a dedicated crypto-processor used for accessing its contents and executing secure operations.

A "token requestor" may refer to an entity that is seeking to implement tokenization according to embodiments of the present invention. The token requestor may initiate a request that a PAN be tokenized by submitting a token request message to the token service provider. According to various embodiments discussed herein, a token requestor may no longer need to store a PAN associated with a token once the requestor has received the payment token in response to a token request message. The requestor may be an application, a device, a process, or a system that is configured to perform actions associated with tokens. For example, a requestor can request registration with a network token system, request token generation, token activation, token de-activation, token exchange, other token lifecycle management related processes, and/or any other token related processes. A requestor may interface with a network token system through any suitable communication network and/or protocol (e.g., using HTTPS, SOAP and/or an XML interface among others). Some non-limiting examples of token requestors may include, for example, card-on-file merchants, acquirers, acquirer processors, and payment gateways acting on behalf of merchants, payment enablers (e.g., original equipment manufacturers, mobile network operators, etc.), digital wallet providers, issuers, third-party wallet providers, and/or payment processing networks. In some embodiments, a token requestor can request tokens for multiple domains and/or channels. A token requestor may be registered and identified uniquely by the token service provider within the tokenization ecosystem. During token requestor registration, the token service provider may formally process a token requestor's application to participate in the token service system. The token service provider may collect information pertaining to the nature of the requestor and relevant use of tokens to validate and formally approve the token requestor and establish appropriate domain restriction controls. Successfully registered token requestors may be assigned a token requestor identifier that may also be entered and maintained within the token vault. Token requestors can be revoked or assigned new token requestor identifiers. This information may be subject to reporting and audit by the token service provider.

A "token service provider" may refer to an entity including one or more server computers in a token service system that generates, processes and maintains payment tokens. The token service provider may include or be in communication with a token vault where the generated tokens are stored. Specifically, the token vault may maintain one-to-one mapping between a token and a PAN represented by the token. The token service provider may have the ability to set aside licensed Bank Identification Numbers (BINs) as token BINs to issue tokens for the PANs that may be submitted to the token service provider. Various entities of a tokenization ecosystem may assume the roles of the token service provider. For example, payment networks and issuers or their agents may become the token service provider by implementing the token services according to embodiments of the present invention. A token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. The EMVCo standards organization has published specifications defining how tokenized systems may operate. While such specifications may be informative, they are not intended to be limiting upon any of the embodiments disclosed herein.

A "token vault" may refer to a repository that maintains established token-to-PAN mappings. According to various embodiments, the token vault may also maintain other attributes of the token requestor that may be determined at the time of registration and that may be used by the token service provider to apply domain restrictions or other controls during transaction processing. The token vault may be a part of a token service system. In some embodiments, the token vault may be provided as a part of the token service provider. Alternatively, the token vault may be a remote repository accessible by the token service provider. Token vaults, due to the sensitive nature of the data mappings that are stored and managed in them, may be protected by strong underlying physical and logical security. A token vault may be operated by any suitable entity, including a payment network, an issuer, clearing houses, other financial institutions, or any other entity.

A "transaction server" may refer to an entity that can perform or facilitate the performance of a transaction, which may include the purchase of goods or services. Non-limiting examples of entities operating a transaction server may include merchants, payment gateways, or other servers.

The embodiments disclosed herein provide numerous technical benefits, some non-exhaustive examples of which include: (1) eliminating the need for individual disparate computing devices to locally store account data, thus removing the need for such devices to include expensive and complex hardware components, such as a secure element, dedicated cryptographic processor, or additional tamper resistant memories; (2) eliminating the need for disparate computing devices to transmit (or receive, via provisioning) account data across a local network and to/from a transaction server or resource provider, thus reducing network traffic on the local network and further reducing the associated processor cycles needed to handle and process such traffic; (3) increasing the security of transactions performed by computing devices using account data because of the relative ease with which traffic transmitted across certain types of local networks can be "sniffed" or intercepted by other devices connected to the same local network; and (4) reducing the number of read/write operations associated with updating account data, as such operations would only need to occur on a centralized network appliance in the embodiments disclosed herein, instead of requiring such updates to account data to occur on each individual disparate computing device. Non-limiting embodiments also include improved network appliances, such as but not limited to improved routers, modems, or repeaters, that include a secure element for performing and facilitating secure transactions in an IOT environment.

Turning now to the figures, FIG. 1 depicts aspects of elements that may be present in a network appliance 101 configured to implement a method and/or process in accordance with some embodiments of the present invention. Network appliance 101 may contain at least one central processing unit ("CPU" or "processor") 102, which is used for executing computer instructions. Network appliance 101 may contain power supply 103, responsible for delivering power to network appliance 101 via an electrical socket, one or more batteries, or any other acceptable method or source for powering an electronic device. Network appliance 101 may also contain one or more network interfaces 104, which enable the transmission and receipt of information across one or more electronic networks. Network interfaces 104 may enable network appliance 101 to connect to the Internet, connect to or establish other public or private networks, and may comprise software, circuitry and other hardware, or a combination thereof capable of establishing communication with, and transmitting data to and receiving data from other electronic devices over various communication channels. Non-limiting examples of components of network interfaces 104 may include an on-board modem, network bridge, or other circuitry enabling bidirectional data communication with an Internet Service Provider ("ISP") or any other entity capable of providing connectivity to the Internet or a telecommunications network. Network interfaces 104 may also support and enable local, proximity based electronic communication technologies, such as Near-Field Communications ("NFC"), Radio Frequency Identification ("RFID"), Bluetooth®, infrared, or other such short-range communication techniques.

Network appliance 101 may also contain secure element 105, which may be used as temporary or long-term storage of secure data, such as account data 108, which may comprise payment card information, banking information, shipping information, or other types of data used for performing a payment transaction. In some non-limiting embodiments, network appliance 101 may not contain a secure element, and may instead contain only standard computer memory, such as memory 106, which it may use to store account data 108. Memory 106 may include executable instructions 107 and other information necessary for operation and for facilitating the provisioning, retrieval, and transmission of account data. Executable instructions 107 may comprise one or more sequences, codes or micro-operations that perform arithmetic, logic, or other operations executable by processor 102 or any other microprocessor or logic unit. Non-limiting examples of executable instructions 107 may further include code to enable inspection and modification of data packets received via network interfaces 104, as well as routing and transmission of such data packets.

In some embodiments, network appliance 101 may also function as a router, modem, network switch, repeater, home automation hub, smartphone, tablet, any other computing, telecommunications, or networking equipment, or any combination thereof, and may also be responsible for providing and maintaining a connection to the Internet through a telecommunications network. The Internet connection maintained by network appliance 101 may utilize fixed, wire-based physical layer connections over any suitable mediums, such as coaxial cables, fiber optic cables, Ethernet cables, or telephone lines, or via a wireless medium, such as LTE, WiMAX, satellite link, packet radio, or any other suitable communication medium. In such embodiments, memory 106 may contain routing table 108, which may store the routes to other network nodes and destinations.

Figure 2:
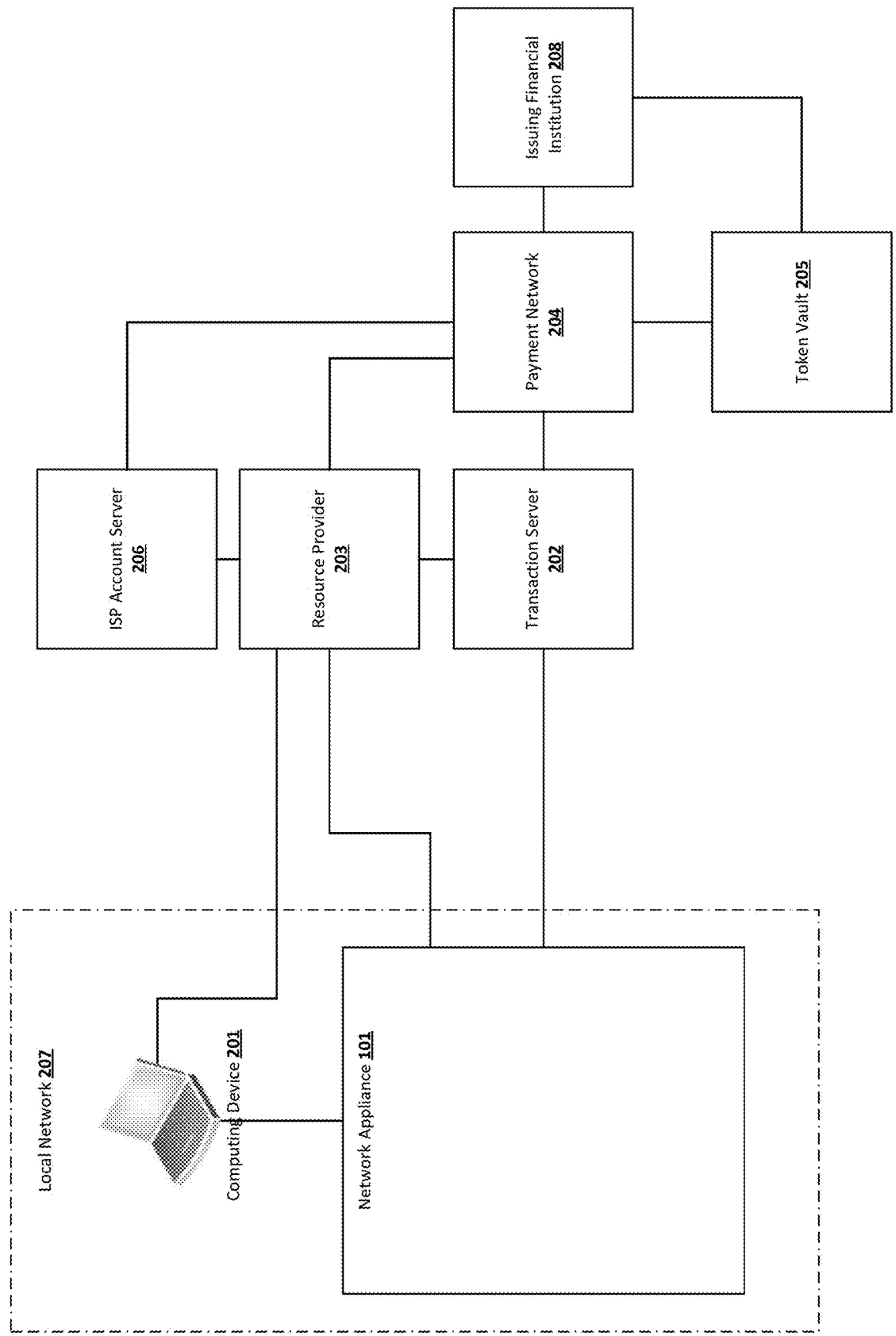
FIG. 2 depicts an illustrative non-limiting example of a system for implementing the provisioning and use of account data in a transaction.

FIG. 2 depicts an illustrative non-limiting example of a system for implementing the provisioning and use of account data in a transaction. Provisioning and transacting with account data may involve interactions among individual entities, such as transaction server 202, resource provider 203, payment network 204, token vault 205, ISP account server 206, and issuing financial institution 208, all of which may be servers connected by one or more communication channels. It should be appreciated by a person of skill in the art that these entities can be operated by one entity or multiple disparate entities, and may reside on one or many servers, whether virtual or physical.

Computing device 201 may be a mobile phone, a tablet, a desktop or notebook computer, a wearable device, a smart appliance, or any other suitable computing device connected to network appliance 101 and local network 207. Computing device 201 may contain a direct method of input via a keyboard, mouse, touch-screen or tactile input, through a network input, or through any suitable peripheral. Computing device 201 may further store and execute a software application capable of managing the storage and use of account data on network appliance 101, or the permissions associated with accessing account data. In some embodiments, computing device 201 may contain an application capable of storing and provisioning account data to network appliance 101. A non-limiting example of such applications may include a "mobile wallet," such as those provided by financial institutions or device operating system developers. Upon verifying that the request for account data originated from an authorized account holder, computing device 201 may obtain account data from resource provider 203 and/or token vault 205, and may provision that account data to network appliance 101, via any suitable method. Non-limiting examples of such methods may include NFC, RFID, Bluetooth®, infrared, or any other suitable wired or wireless communication protocols.

In some embodiments, software applications capable of managing the storage and use of account data may also be hosted and executed on network appliance 101, and may be remotely accessed via computing device 201. Network appliance 101 may host or operate local network 207, and may function as a network switch or router, enabling computing device 201 to communicate over the public Internet, as well as with transaction server 202, resource provider 203, and any other relevant server or system. Local network 207 may be any type of computer network, such as a Local Area Network ("LAN"), and may be an Internet Protocol ("IP") based network, mesh network, or any type of suitable computer network.

Resource provider 203 may be a server hosted or operated by payment network 204, or may be an independent entity. In some embodiments, resource provider 203 may be a token requestor, and may be capable of communicating with payment network 204 to request and obtain a payment token, and to provision the payment token to a device, such as network appliance 101 or computing device 201. In some embodiments, resource provider 203 may be operated by a mobile network operator or a device manufacturer or device operating system developer. Resource provider 203 may be in communication with or capable of communicating with ISP account server 206. In some embodiments, ISP account server 206 may be hosted or operated by an ISP, mobile network operator, or telecommunications network providing connectivity or other services to network appliance 101, computing device 201, and/or local network 207. Resource provider 203 and ISP account server 206 may store electronic files, records, databases, or any other data structure capable of associating a network address, such as an IP address, MAC address, or any other unique network identifier with a registered physical address. This registered physical address may indicate a billing address, mailing address, or in some embodiments, an address corresponding to the location where network connectivity is provided by an ISP. ISP account server 206 may be in communication with resource provider 203 or payment network 204, and upon request, may be capable of providing information related to a registered physical address or a network address.

Transaction server 202 may be a consumer facing merchant web site through which consumers may conduct online shopping or e-commerce, and may be accessed through computing device 201. Transaction server 202 may be connected to payment network 204 directly or indirectly. A non-limiting example of a direct connection from transaction server 202 may include Visa's Merchant Direct Exchange ("MDEX") offering. Indirect connections to payment network 204 may include a communications link to an acquiring bank, a payment gateway, or any other suitable entity involved in the facilitation of electronic payments.

Payment network 204 may include one or more servers capable of processing electronic payment transactions, both in open-loop and closed-loop configurations. A non-limiting example of payment network 204 may include VisaNet® as operated by Visa, Inc. Token vault 205 may be part of payment network 204, issuing financial institution 208, or any other entity. Token vault 205 may contain a relational database or other form of electronic file or data structure containing mappings of certain account data to other types of account data. In one non-limiting embodiment, token vault 205 may contain a mapping or association between PAN data and payment tokens. Upon request, token vault 205 may be capable of detokenizing a received token by retrieving the PAN associated with a token. Issuing financial intuition 208 may be a bank, credit union, or other type of financial institution capable of extending credit and authorizing or declining electronic payment transactions.

Figure 2A:
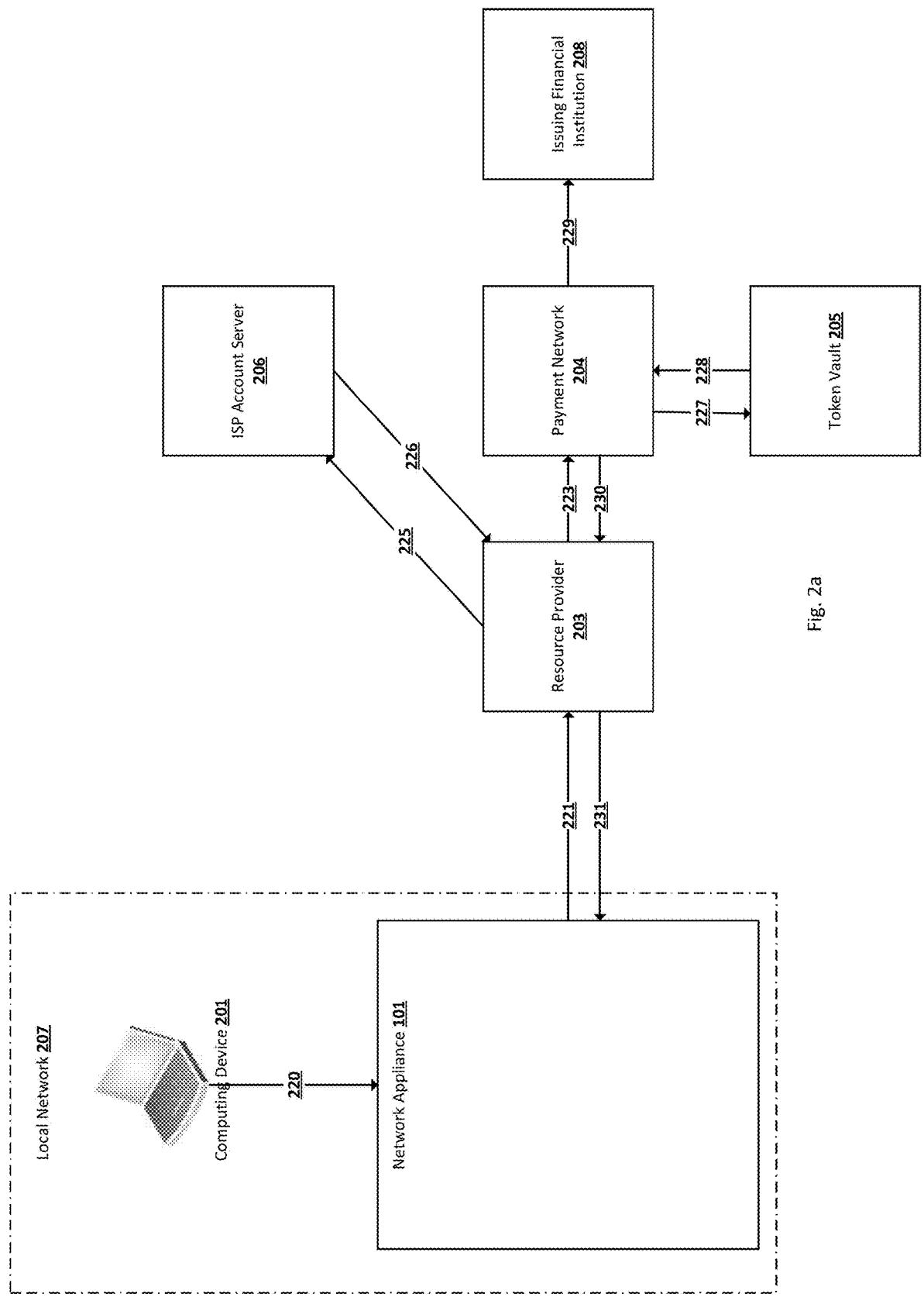
FIG. 2a depicts an illustrative non-limiting example of a system for implementing the provisioning and use of account data.
Figure 2B:
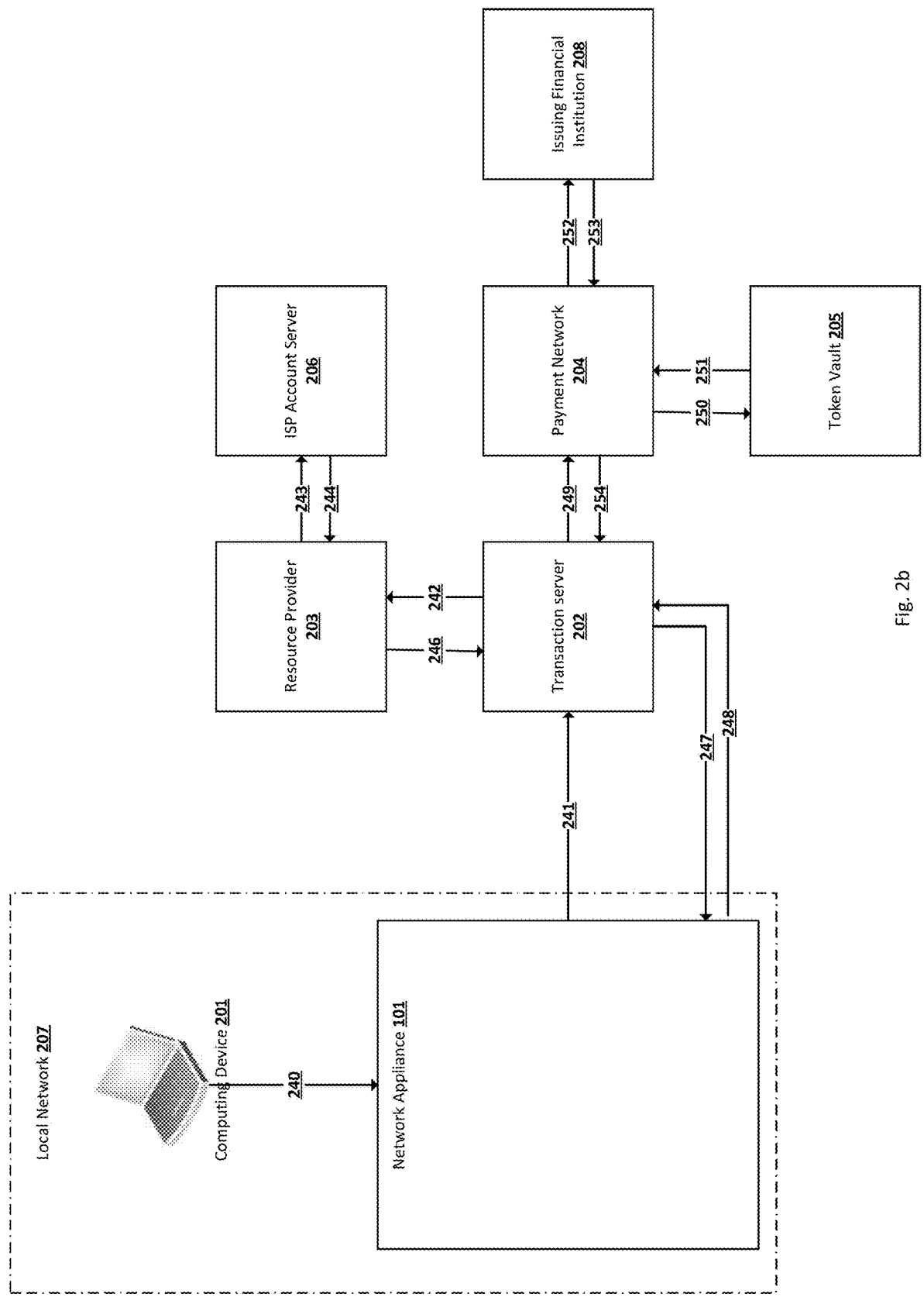
FIG. 2b depicts an illustrative non-limiting example of a system for performing a transaction.
Figure 2C:
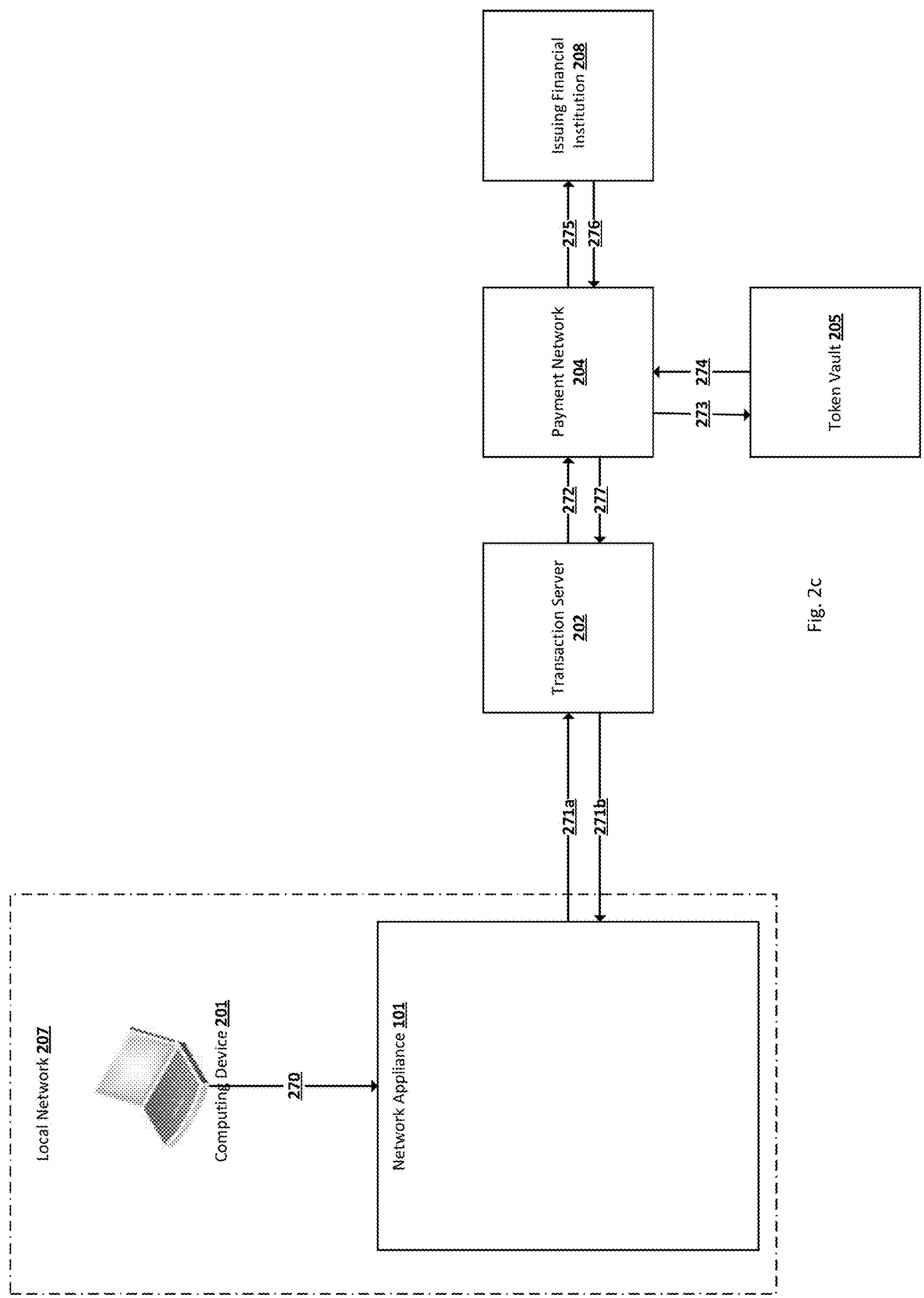
FIG. 2c depicts an illustrative non-limiting example of a system for performing a transaction.

It should be appreciated that all entities depicted in FIG. 2 may be connected via an electronic communications network, whether public or private, including but not limited to the Internet. All such entities may be capable of communicating with one another. It should be further appreciated by persons of skill in the art that payment network 204, issuing financial institution 208, and token vault 205 may be operated by the same or different entities, and may consist of one or more servers. Such servers need not be co-located, and may reside in disparate locations. FIGS. 2a, 2b, and 2c, as described below recite further embodiments and uses of the systems depicted in FIG. 2.

FIG. 2a depicts an illustrative non-limiting example of a system for implementing the provisioning and use of account data, such as a payment token, in a transaction. In some embodiments, at step 220, computing device 201 may transmit a request to obtain account data, including, in some embodiments, a request to obtain a payment token. Network appliance 101 may forward this request to resource provider 203 at step 221. The contents of the request may be specific to resource provider 203 or payment network 204, but non-limiting examples of such a request may include certain account data, such as a PAN, an expiration date, a CVV or CVV2 value, an identifier of the requesting device or user, a name, a physical address, a network address, a billing address, a phone number, or any other data suitable or necessary for resource provider 203 to provision account data to network appliance 101. In some non-limiting embodiments, this request may originate from a software application running on computing device 201, and may optionally be sent directly to resource provider 203, or through network appliance 101. If the request is sent through network appliance 101, network appliance 101 may then send all or part of the request to resource provider 203.

Resource provider 203 may receive the request, and may reformat it, add additional data to it, or remove data from it, and at step 223 resource provider 203 may forward the request to payment network 204 or to any other suitable entity. It should be appreciated that resource provider 203 need not be independent from payment network 204, and could be operated by that entity or issuing financial institution 207 or any other third party. Resource provider 203 may then attempt to verify that the request originated from an authorized account holder.

In some non-limiting embodiments in which network address information relating to network appliance 101 or computing device 201 is contained in the received request for account data, resource provider 203, payment network 204, or any other entity may attempt to determine whether the network address of computing device 201 or network appliance 101 corresponds to a registered physical address, and whether the registered physical address corresponds to a known billing address associated with an account. This verification can occur locally by comparing the network address from which the request originated with a locally stored list of network addresses and physical addresses.

The verification can also occur through communications with ISP account server 206, as shown at step 225, which may be hosted or operated by a telecommunications provider operating a network that connects local network 207 to the Internet or to other computer networks. In such non-limiting embodiments, at step 225, resource provider 203 or any other entity may send the network address corresponding to computing device 201 or network appliance 101 to ISP account server 206 to obtain a corresponding physical address, which is returned by ISP account server 206 at step 226. Resource provider 203 may then determine whether the physical address corresponding to the network address obtained from computing device 201 or network appliance 101 matches a billing address associated with account data. If the physical address and billing address match, resource provider 203, or any other suitable entity may also store the network address corresponding to computing device 201 or network appliance 101 in a record, file, or database entry associated with the particular account or account data, which may include a physical address or billing address, or on a list of authorized network addresses, for future verifications, such that resource provider 203 may perform such verification. If the addresses do not match, resource provider 203 may inform computing device 201 or network appliance 101 of the inability to locate a match, and resource provider 203 may attempt to request other forms of authentication by the user of computing device 201 or network appliance 101 to verify that the party seeking use of the account data is authorized to do so. Some non-limiting examples of such methods may include the transmission and confirmation of a one-time password to a known or recognized device, or through the use of password-based authentication. It should be appreciated by a person of skill in the art that numerous methods existing for verifying that the originator of a request for account data is authorized to request and receive account data.

Upon verification that the request for account data originated from an authorized account holder, at step 223 resource provider 203 may proceed to forward the request for account data to payment network 204. At step 227, payment network 204 may then request account data from token vault 205 for provisioning to network appliance 101. In processing this request, token vault 205 may associate a payment token with other information contained in the request, such as the PAN, and may store that association in a data file, database, or other suitable electronic record. At step 228, token vault 205 may provide account data to payment network 204. At step 229, payment network 204 may also optionally forward the request for account data or account data itself to issuing financial institution 208. At step 230, payment network 204 may provide account data to resource provider 203, which may then provision the account data to network appliance 101 for storage in a secure or tamper resistant memory, such as a secure element. Resource provider 203 may also optionally store the account data locally. At step 231, resource provider 203 may provision account data to network appliance 101 by securely transmitting it to network appliance 101 and causing such account data to be written to the secure element.

It should be appreciated by a person of skill in the art that resource provider 203, payment network 204, and issuing financial institution 208 may all be capable of performing the steps described above, that FIG. 2a is merely one non-limiting example of a process flow between such entities, and that nothing in this description is intended to limit such flows to only those specific embodiments. It should also be appreciated by a person of skill in the art that numerous configurations are possible, and that all entities depicted may be in communication with one or multiple other entities over any type of communication channel suitable for the transmission of data.

FIG. 2b depicts an illustrative non-limiting example of a system for performing a transaction. In a non-limiting embodiment, a consumer operating computing device 201 may send a request to perform a transaction to transaction server 202. Non-limiting examples of a transaction request may include an HTTP POST command, an application programming interface ("API") call to transaction server 202, which may occur through interaction with a browser-based checkout page, or any other suitable method for sending a request to perform a transaction. Computing device 201 may submit this transaction request to transaction server 202 via network appliance 101, as depicted at step 240. Network appliance 101 may then forward this request to transaction sever 202, as depicted at step 241.

In some non-limiting embodiments, the request to perform a transaction may contain only information relating to the request's origin, which may include a network address corresponding to network appliance 101 or computing device 201. At step 242, transaction server 202 may attempt to verify that the network address from which the request originates corresponds to a registered physical address by forwarding information relating to the shipping address and/or the network address from which the request originated to resource provider 203. Resource provider 203 may then perform a search of a list of authorized network addresses to determine if the network address has been previously authorized to perform transactions. If a match is not found, resource provider 203 may optionally forward the network address to ISP account server 206 at step 243. At step 244, ISP account server 206 may return a registered physical address corresponding to the originating network address contained in the request. If a desired shipping address was provided in the transaction request, resource provider 203 may then determine whether the desired shipping address matches a registered physical address and/or an account data billing address. If these items match, or if resource provider 203 found a match by searching its list of its previously authorized network addresses, then at step 246, resource provider 203 may inform transaction server 202 of the match. In some non-limiting embodiments, resource provider 203 may optionally provide account data to transaction server 202 if resource provider 203 has such account data locally stored. Resource provider 203 may also store the network address corresponding to computing device 201 or network appliance 101 in a record or file associated with the particular account or account data, or on a list of authorized network addresses.

Because the network address of network appliance 101 and/or computing device 201 has been verified to correspond to a registered physical address, transaction server 202 may proceed to obtain account data, and may conduct a transaction using account data if the account data includes an address that matches the registered physical address. In some non-limiting embodiments, once transaction server 202 has obtained account data, transaction server 202 may also automatically populate a shipping address for the delivery of items using the registered physical address, and may also populate any other fields using data received from resource provider 203 or network appliance 101.

In another non-limiting embodiment, at step 247, upon address verification, transaction server 202 may request account data from network appliance 101 and may provide data pertaining to the transaction to network appliance 101. Requests for account data may be transmitted between network appliance 101 and transaction server 202 using a variety of known techniques, including a web service, a Web API, or any other technique for enabling interaction and interoperability between such entities.

Prior to providing account data to transaction server 202, network appliance 101 may verify that computing device 201 is authorized to conduct transactions with that account data. Such verification may be performed by searching a data file, record, or database entry stored on network appliance 101 consisting of the network address or other device specific information corresponding to computing devices authorized to transact using account data stored on network appliance 101. In another non-limiting embodiment, network appliance 101 may simply confirm that computing device 201 is connected to the same network as network appliance 101, such as local network 207. Upon verifying that computing device 201 is authorized to conduct transactions, network appliance 101 may retrieve such account data from its secure element, and may send that account data to transaction server 202, as shown at step 248. Network appliance 101 may also optionally generate a cryptogram using data received from transaction server 202 in step 247, which may be included in the account data sent to transaction server 202 in step 248. Network appliance 101 may also confirm that the request for account data received at step 247 originated from the transaction server 202 to which the original transaction request at step 241 was transmitted, thus ensuring that account data is not provided to unintended parties.

Transaction server 202 may then submit an authorization request message containing account data to payment network 204 seeking to authorize the transaction at step 249. It should be appreciated by persons of skill in the art that transaction server 202 may submit the authorization request message to payment network 204 through a payment gateway, acquiring bank server, or other such entity. If the received account data contains a payment token, payment network 204 may send all or part of the account data to token vault 205 for detokenization at step 250, whereby token vault 205 may return a PAN corresponding to the payment token at step 251. Payment network 204 may then proceed to contact issuing financial institution 207 at step 252 seeking authorization of the transaction by forwarding all or some of the authorization request message, and the corresponding account data. Issuing financial institution 207 may then approve or decline the transaction, notifying the transaction server at step 253, by responding to the authorization request message. Payment network 204 may forward that approval or decline to transaction server 202 at step 254.

It should be appreciated by a person of skill in the art that numerous configurations are possible, and that all entities depicted may be in communication with one or multiple other entities over any type of communication channel suitable for the transmission of data.

FIG. 2c depicts an illustrative non-limiting example of a system for performing a transaction using a network appliance. At step 270, computing device 201 may send a request intended for transaction server 202 to perform a transaction, which may be structured or formatted in one or more data packets, and may be sent through network appliance 101. Upon receiving a request destined for transaction server 202, network appliance 101 may inspect the request to determine whether it originated from a device connected to local network 207, and may also perform additional analysis to confirm that computing device 201 is trusted to perform transactions. One non-limiting example of such analysis may include comparing information about computing device 201 with stored information, such as a "white-list" of trusted computing devices. If network appliance 101 determines that computing device 201 is not trusted to perform transactions, network appliance 101 may instruct a user of computing device 201 to authenticate in order to promote computing device 201 to trusted status, using any suitable authentication technique. Upon determining that computing device 201 is a trusted device, network appliance 101 may then retrieve account data from its secure element or other location where account data may be stored, including external devices or servers. Network appliance 101 may then modify the transaction request message destined for transaction server 202 by inserting account data into an appropriate data field in the request, and may then forward the modified request message at step 271a to transaction server 202.

In another non-limiting embodiment, at step 271a, network appliance 101 may simply send the account data to transaction server 202 in a separate communication, rather than modifying the transaction request sent from computing device 201 by providing information allowing transaction server 202 to correlate the transmission of account data with the transaction request. It should be appreciated by persons of skill in the art that the separate communication through which network appliance 101 may send the account data may occur over the same communications channel using a different port or protocol, or over a completely different communications channel.

Upon receiving the modified request message, transaction server 202 may then submit an authorization request message containing account data to payment network 204 seeking to authorize the transaction at step 272. It should be appreciated by persons of skill in the art transaction server 202 may submit the authorization request message to payment network 204 through a payment gateway, acquiring bank server, or other such entity. If the received account data contains a payment token, payment network 204 may send all or part of the account data to token vault 205 for detokenization at step 273, whereby token vault 205 may return a PAN corresponding to the payment token at step 274. Payment network 204 may then proceed to contact issuing financial institution 207 at step 275 seeking authorization of the transaction by forwarding all or some of the authorization request message, and the corresponding account data. Issuing financial institution 207 may then approve or decline the transaction by responding to payment network 204 at step 276. Payment network 204 may forward that approval or decline to transaction server 202 at step 277.

It should be appreciated by a person of skill in the art that network appliance's 101 ability to inspect and modify a transaction request originating from computing device 201 may be limited if the request is not sent in the clear, and if data encryption techniques, such as secure socket layer (SSL) or transport layer security (TLS), are employed to encrypt communications between computing device 201 and transaction server 202. In such instances, network appliance 101 would require the ability to decrypt a request message. Non-limiting examples of how network appliance 101 might decrypt the encrypted request message include granting network appliance 101 access to a computing device's private key used in public-key encryption, or in asymmetric encryption, granting network appliance 101 access to the cryptographic key used in the communication or the underlying shared secret. In such non-limiting embodiments, network appliance 101 would decrypt the request message, inject account data into it, and re-encrypt the message prior to sending it to transaction server 202.

In another non-limiting embodiment, rather than injecting account data into a packet, transaction server 202 may optionally request account data directly from network appliance 101 by utilizing the current or a new communication session with network appliance 101, as depicted at step 271b. In such an embodiment, network appliance 101 may notify transaction server 202 by setting a flag in the transaction request message sent during step 271a indicating that network appliance 101 has account data stored which can be provided upon request. In such an embodiment, account data and requests for account data may be requested or transmitted between network appliance 101 and transaction server 202 using a variety of known techniques, including a web service, a Web API, or any other technique for enabling interaction and interoperability between such entities.

It should be appreciated by a person of skill in the art that numerous configurations are possible, and that all entities depicted may be in communication with one or multiple other entities over any type of communication channel suitable for the transmission of data.

Figure 3A:
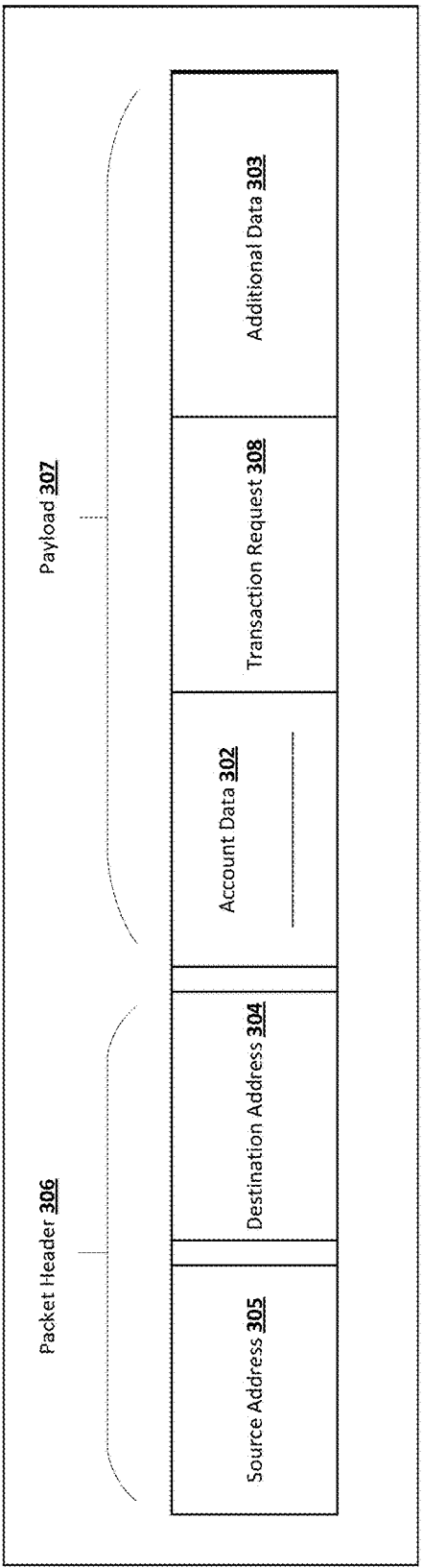
FIG. 3a depicts aspects of some elements that may be present in a data packet configured for use in accordance with some embodiments of the present invention.

FIG. 3a depicts aspects of some elements that may be present in a data packet configured for use in accordance with some embodiments of the present invention. In such embodiments, data packet 301 may contain all or part of a request to perform a transaction originating from a computing device and destined for a merchant transaction server, and may include packet header 306 and payload 307. Source address 305 may contain information corresponding to the network address of a computing device that created and sent data packet 301, and destination address 304 may contain information corresponding to the network address of the intended destination. Both source address 305 and destination address 304 may reflect the required format of the underlying network protocol and topography. Non-limiting examples of such network protocols are the IP or Transmission Control Protocol over Internet Protocol ("TCP/IP").

Payload 307 of data packet 301 may contain account data 302. In some non-limiting embodiments, account data 302 may be blank, incomplete, or contain dummy-data intended to be replaced or substituted by a network appliance which receives and modifies the data to create a new or modified data packet. Data packet 301 may also contain transaction request 308, which may represent a request to perform a financial transaction. Non-limiting examples of financial transactions may include a purchase, a return, funds transfer, or any other transaction. Data packet 301 may also contain additional data 303, which may carry additional data about a communication session between a computing device, a network appliance, and/or a transaction server. Additional data 303 may also carry connection or session related data pertaining to the underlying communication protocol. It should be appreciated by a person of skill in the art that a request to perform a transaction may be carried in one or more data packets.

Figure 3B:
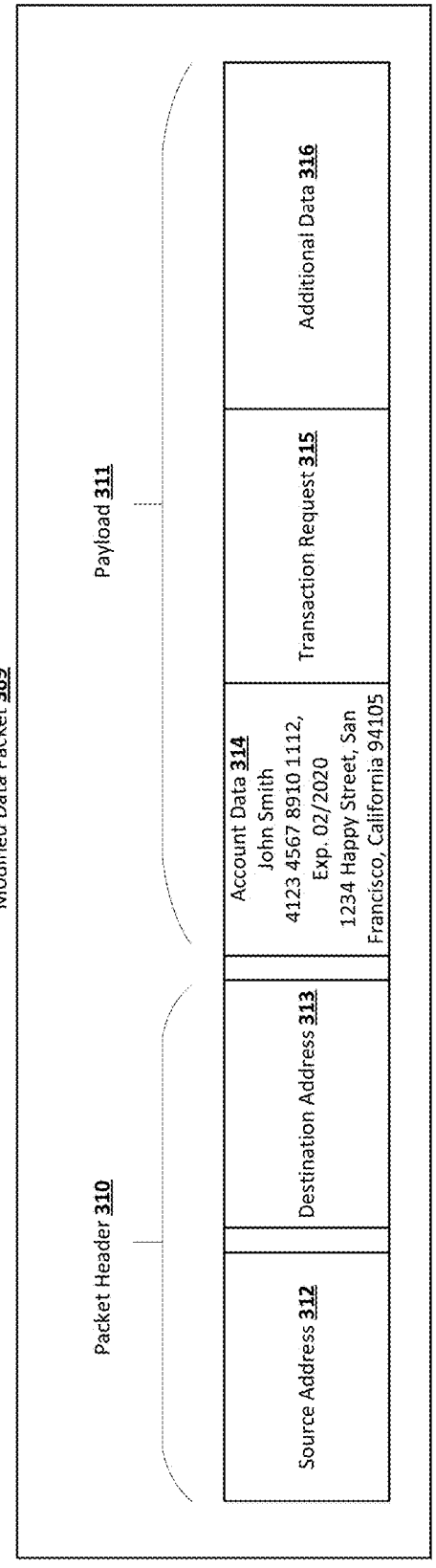
FIG. 3b depicts aspects of some elements that may be present in a modified data packet configured for use in accordance with some embodiments of the present invention.

FIG. 3b depicts aspects of some elements that may be present in a modified data packet configured for use in accordance with some embodiments of the present invention, especially those depicted in FIG. 2c. Modified data packet 309 may contain all or part of a modified request to perform a transaction originating from a computing device and destined for a merchant transaction server, but may be modified by one or more network appliances residing in between those entities. Modified data packet 309 may include packet header 310 and payload 311. Source address 312 may contain information corresponding to the network address of a computing device that created and sent modified data packet 309, and destination address 313 may contain information corresponding to the network address of its intended destination. In yet another embodiment, source address 312 may initially contain network address information corresponding to a computing device from which a data packet was received, but then source address 312 may be modified by a receiving network appliance to reflect the network address of the network appliance prior to sending modified data packet 309 to a transaction server. In computer networks implementing techniques such as Network Address Translation ("NAT"), such source address modifications may occur. Both source address 312 and destination address 313 may reflect the required format of the underlying network protocol and topography. Non-limiting examples of such network protocols are the IP or TCP/IP.

Payload 311 of modified data packet 309 may contain account data 314. In some non-limiting embodiments, account data 314 may be modified from blank, incomplete, or dummy-data to contain account data retrieved by a network appliance from its secure element. Account data 314 may include a payment account number, a payment token, billing and shipping information, a username and password, a cryptogram, or any other information suitable to conduct a transaction. Modified data packet 309 may also contain transaction request 315, which may represent a request to perform a financial transaction. Non-limiting examples of financial transactions may include a purchase, a return, funds transfer, or any other transaction. Modified data packet 309 may also contain additional data 316, which may carry additional data about a communication session between a computing device, a network appliance, and/or a transaction server. Additional data 316 may also carry connection or session related data pertaining to the underlying communication protocol. It should be appreciated by a person of skill in the art that a request to perform a transaction may be carried in one or more modified data packets.

Figure 4:
FIG. 4 depicts aspects of some elements that may be present in a list of authorized network addresses in accordance with some embodiments of the present invention.

FIG. 4 depicts aspects of some elements that may be present in a list of authorized network addresses in accordance with some embodiments of the present invention. Authorized network address list 401 may reside at any location accessible by a transaction server to verify that the network address of a computing device or network appliance corresponds to a registered physical address. In some non-limiting embodiments, an entity likely to maintain a network address to physical address mapping may include a server residing at an ISP, while an entity likely to maintain account data may include a payment network, token vault, or issuing financial institution. Accordingly, a resource provider, such as a token service provider or payment network may, in some non-limiting embodiments, maintain authorized network address list 401 and may obtain the information contained therein from any party, correlate it, and store it locally or remotely.

Authorized address list 401 may be structured as a table with rows and columns or as a record in a relational database, or in any other suitable computer file format or data structure. Authorized address list 401 may contain data that was obtained from other sources, local or remote. Non-limiting examples of the types of data that an authorized address list 401 may contain include a physical address associated with a payment account, an ISP account, or other accounts relevant for identifying the physical location associated with an electronic device with network connectivity. Authorized address list 401 may also contain a network address corresponding to a computing device, a network appliance, or other network equipment connected to a network, and this information may be indicative of where a computing device, network appliance, or other network equipment are located. Network addresses may be in any format, or may correspond to a particular type of network. In some non-limiting embodiments, network addresses may be stored as "physical layer" addresses such as a MAC address, while in other embodiments network addresses may be formatted as an octet structure, such as IPV4 addressing scheme.

When a network appliance attempts to conduct a transaction with a transaction server, one or more entities may consult authorized network address list 401 to determine whether the electronic request originates from a location that corresponds to an intended product shipping destination, or that corresponds with a billing address or other account data. Authorized address list 401 may be updated periodically as needed to ensure that the data stored therein is valid and current.

It should be understood and appreciated by a person of skill in the art that nothing in the above is intended to limit the functionality and structures described herein. The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. One or more features from any embodiment may be combined with one or more features of any other embodiment without departing from the scope of the invention. A recitation of "a", "an" or "the" is intended to mean "one or more" unless specifically indicated to the contrary. All patents, patent applications, publications, and descriptions mentioned above are herein incorporated by reference in their entirety for all purposes. None is admitted to be prior art.

The invention claimed is:

1. A method of provisioning account data to a network appliance, comprising:
    obtaining, by a resource provider server, a network address associated with the network appliance;
    obtaining, by the resource provider server, a registered physical address associated with account data, the registered physical address associated with a mailing address;
    determining, by the resource provider server, that the registered physical address matches a known billing address associated with the account data;
    associating, by the resource provider server, the registered physical address with the network address;
    adding, by the resource provider server, the network address to a list of authorized network addresses; and
    in response to determining that the registered physical address matches the known billing address, provisioning, by the resource provider server, a payment token to the network appliance, wherein said provisioning comprises sending the payment token to the network appliance,
    wherein said provisioning comprises storing the payment token in a secure element comprising a hardware security module of the network appliance,
    wherein said provisioning comprises enabling the network appliance to use the payment token to conduct transactions from the registered physical address associated with the network address.

2. The method of claim 1, further comprising receiving, by the resource provider server, a request to confirm that the network address is on the list of authorized network addresses.

3. The method of claim 2, further comprising sending, by the resource provider server, a confirmation that the network address is on the list of authorized network addresses.

4. The method of claim 1, wherein obtaining the registered physical address further comprises sending, by the resource provider server, a request to an ISP account server, wherein the request contains the network address.

5. The method of claim 1, further comprising obtaining, by the resource provider server, the payment token from a payment network, a token vault, an issuing financial institution, or any combination thereof, prior to provisioning the payment token.

* * * * *